P. R. FOWLER & J. A. GINGRICH.
COMPRESSOR.
APPLICATION FILED JULY 13, 1914.

1,179,619.

Patented Apr. 18, 1916.
4 SHEETS—SHEET 1.

Witnesses

Inventors
P. R. Fowler,
J. A. Gingrich
By
Attorneys.

P. R. FOWLER & J. A. GINGRICH.
COMPRESSOR.
APPLICATION FILED JULY 13, 1914.

1,179,619.

Patented Apr. 18, 1916.
4 SHEETS—SHEET 2.

Witnesses
Jno Imirie
W. H. Woodman

Inventor
P. R. Fowler,
J. A. Gingrich.
By
Attorneys.

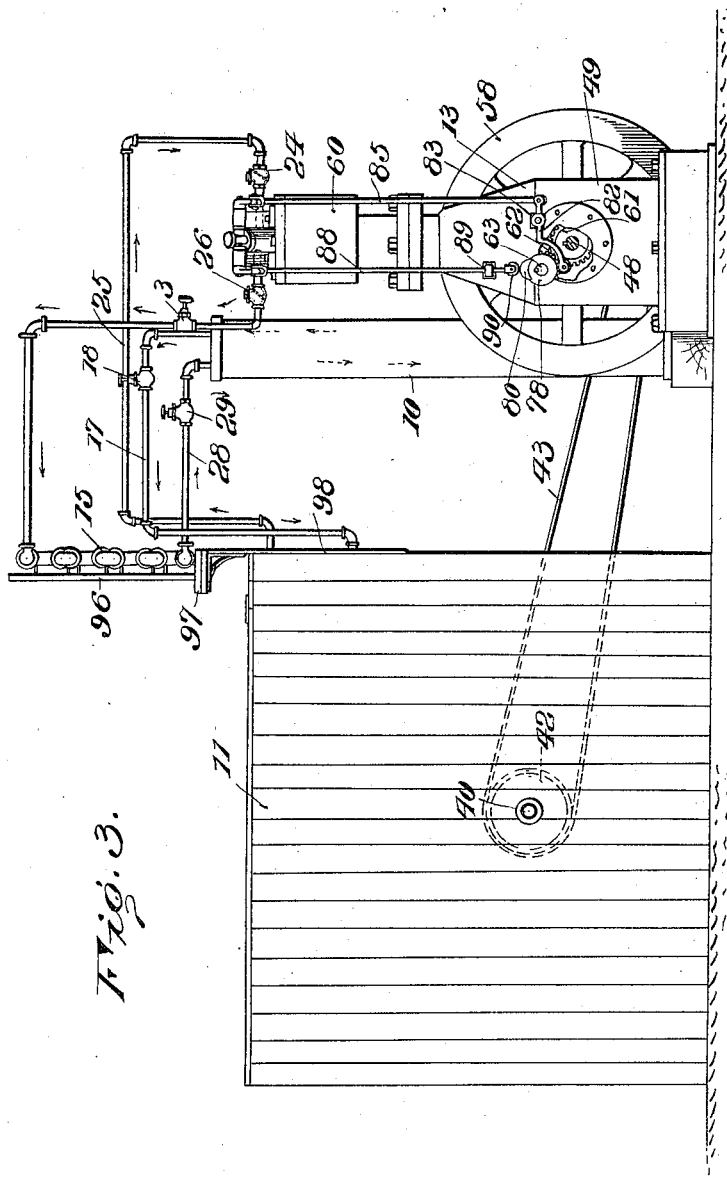

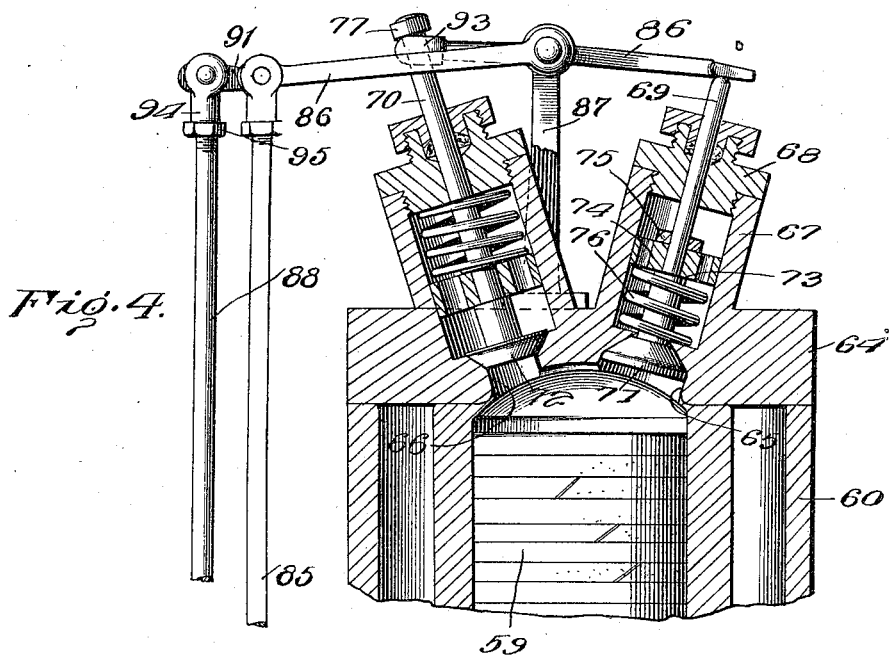
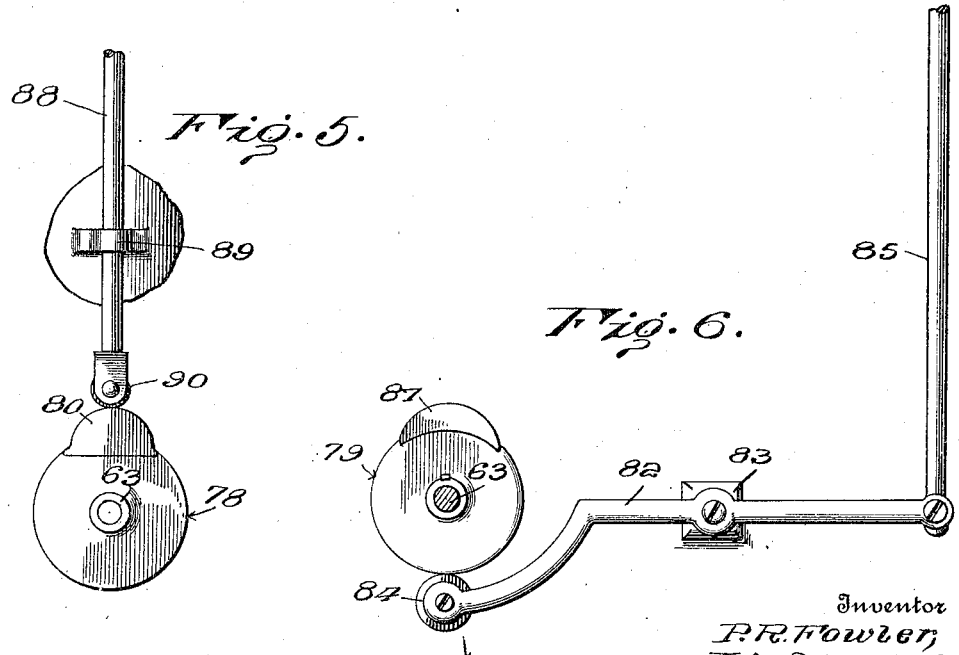

UNITED STATES PATENT OFFICE.

PAUL R. FOWLER AND JOHN A. GINGRICH, OF BROWNWOOD, TEXAS, ASSIGNORS, BY DIRECT AND MESNE ASSIGNMENTS, OF FOUR-NINTHS TO WILLIS B. TONGATE, FIVE-EIGHTEENTHS TO SAID GINGRICH, AND FIVE-EIGHTEENTHS TO JAMES H. RIDGE, ALL OF BROWNWOOD, TEXAS.

COMPRESSOR.

1,179,619.   Specification of Letters Patent.   Patented Apr. 18, 1916.

Application filed July 13, 1914. Serial No. 850,781.

*To all whom it may concern:*

Be it known that we, PAUL R. FOWLER and JOHN A. GINGRICH, citizens of the United States, residing at Brownwood, in the county of Brown and State of Texas, have invented certain new and useful Improvements in Compressors, of which the following is a specification.

Our invention relates to new and useful improvements in refrigerating apparatus and ice manufacturing machines, the primary object of our invention being the provision of a plant of the above described character which may be economically installed and cheaply operated, and which will possess the further advantage of being compact, these features especially adapting the plant for use by relatively small consumers.

A further object of our invention is the provision of a combined refrigerating and ice manufacturing plant in which the ammonia gas employed will be successively passed from the containing tank, through the cooling coils of a refrigerating box, the cooling coils of a brine box, a compressor, a condensing coil and back to the container, the compressor being driven by any suitable form of motor.

In this connection, a further object of our invention is to provide an agitator located in the brine contained in the brine box and driven by the same motor which drives the compressor, a clutch mechanism being provided to permit cutting off of power to the compressor without stopping the operation of the agitator.

A still further object of our invention consists in the provision of a novel form of compressor, particularly to the inlet and outlet valves of the compressor and the operating mechanism therefor, the valves, contrary to the general practice, being held in closed position by heavy springs and being positively opened by means of valve levers operated by connecting rods which are in turn operated by a cam shaft driven by the crank shaft of the compressor.

With these and other objects in view, our invention will be more fully described, illustrated in the accompanying drawings, and then specifically pointed out in the claims which are attached to and form a part of this application.

Figure 1:
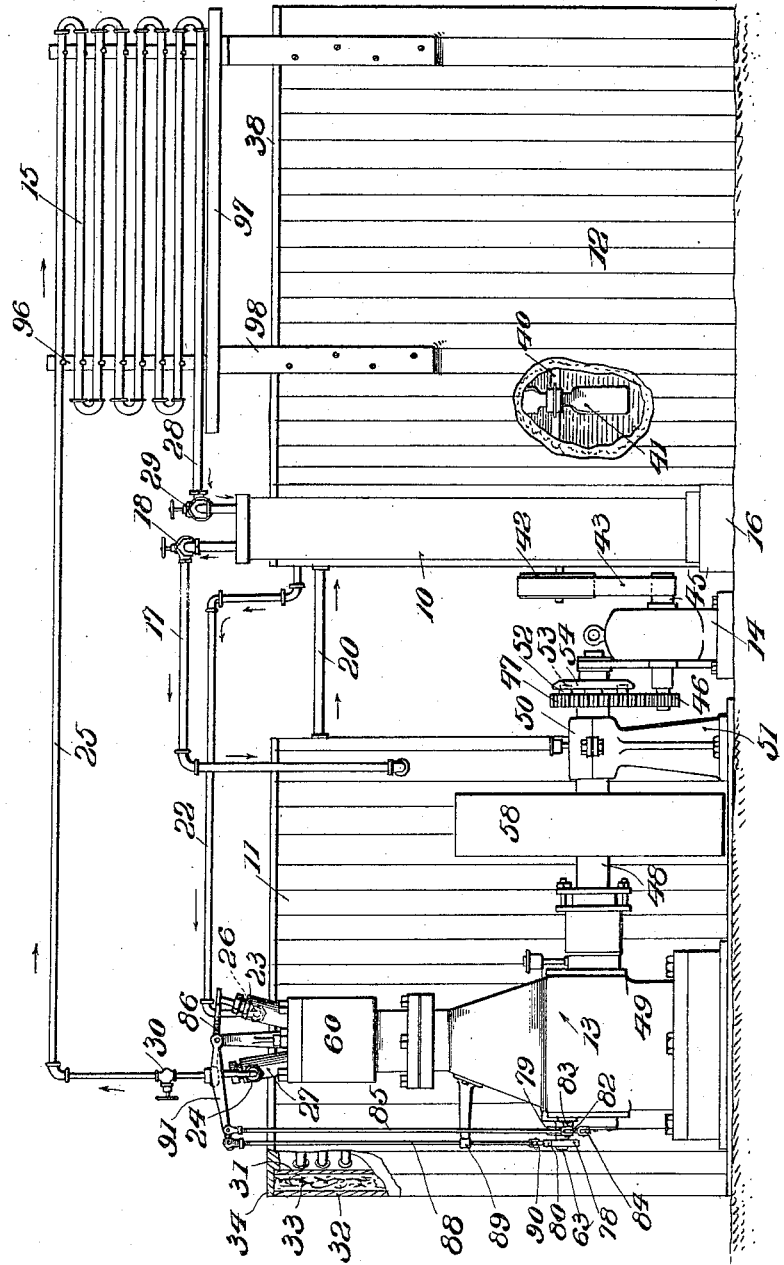
Figure 2:
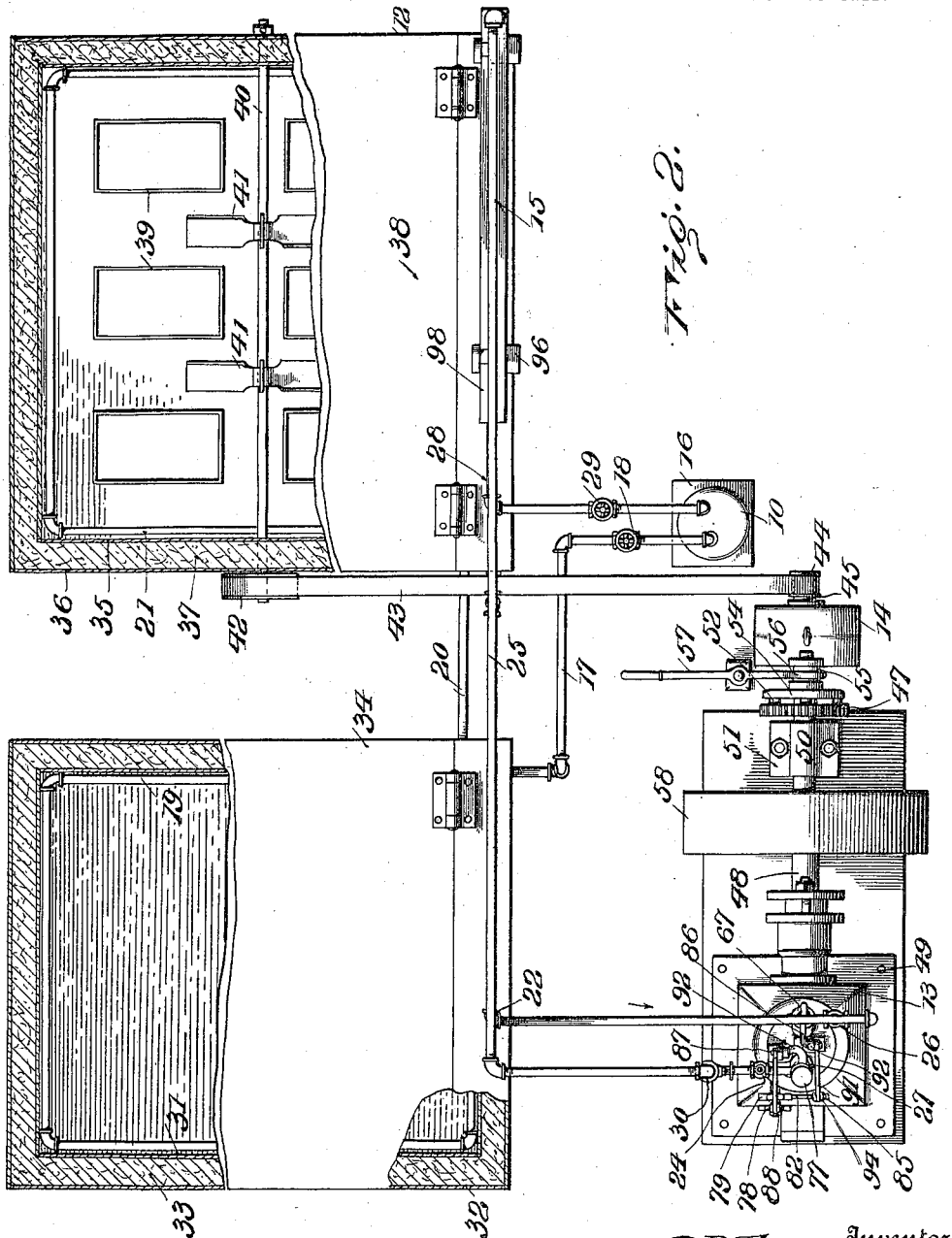

In the drawings: Figure 1 is a front elevation of our improved refrigerating plant, a portion of the refrigerating box being broken away to show its construction and also to disclose the position of the cooling coils, a portion of the brine box being also broken away to somewhat disclose the location of the agitator; Fig. 2 is a top plan view of the structure shown in Fig. 1, portions of the hinged covers and walls of the refrigerating and brine boxes being broken away to show certain details of construction; Fig. 3 is an end elevation, a portion of the crank housing of the compressor being broken away to show the manner in which the cam shaft is driven; Fig. 4 is a fragmentary sectional view taken through the inlet and outlet valves of the compressor cylinder, showing their construction and also the location of the operating levers; Fig. 5 is a fragmentary sectional view of that cam controlling the opening of the outlet valve; Fig. 6 is a similar view of that cam controlling the opening of the inlet valve, part of the valve actuating mechanisms being shown in connection with these figures.

Corresponding and like parts are referred to in the following description and indicated in all the views of the drawings by the same reference characters.

Broadly speaking, our invention consists primarily of an ammonia tank 10, a refrigerating box 11, a brine box 12, a compressor 13 driven by a motor 14, and a condensing coil 15.

The ammonia tank or container 10 may be of any conventional type, an upright cylindrical, metallic tank, supported upon a base 16, being the preferred form. A pipe 17 provided with a cut-off valve 18, preferably of the gate type, leads from the upper end of this tank to one terminal of a cooling coil 19 peripherally located within the refrigerating box 11, while a pipe 20 leads from the opposite end of this coil to one end of a cooling coil 21 peripherally located within the brine box 12. A pipe 22 leads from the other end of this second cooling coil 21 to the inlet valve 23 of the compressor, this pipe being provided adjacent the compressor with a check valve 24. A pipe 25, having a check valve 26, leads from the outlet valve 27 of the compressor to one terminal of the condensing coil 15 and a pipe 28 leads from the other terminal of the condensing coil to the ammonia tank 10, this latter pipe being provided with a cut-off valve 29, corresponding to the valve 28. A cut-off valve 30 is preferably, although not necessarily, exposed in the pipe 25.

The refrigerating box 11 is formed with inner and outer spaced walls 31 and 32, the space between these walls being filled with a packing 33 of sawdust, mineral wool, or other non-heat conducting material and the open upper end of this box is normally closed by a hinged cover 34 which is also preferably formed with inner and outer walls spaced by a packing of non-heat conducting material. The cooling coil 19, contained in this box, is vertically disposed, the convolutions of the coil extending circumferentially about the interior of the box, one below the other, preferably throughout the entire height of the box.

The body of the brine box 12 is practically identical in construction with that of the refrigerating box, including inner and outer spaced walls 35 and 36 separated by a non-heat conducting packing 37, this box being provided with a hinged cover 38, corresponding to the cover 34. The cooling coil 21 is preferably identical in construction and arrangement with that cooling coil 19, previously described. It should be noted, however, at this point, that although the inner and outer walls of the refrigerating box 11 may be both formed of wood, if deemed advisable for the sake of economy, only the outer wall of the brine box 12 can be formed of wood unless the inner wall is provided with a metallic lining as, in use, such box will be filled nearly to the top with brine, as shown in Figs. 1 and 2. This brine box, in use, is adapted to receive a plurality of ice cans 39, these cans being preferably of parallelepiped configuration and being disposed in two parallel rows extending transversely of the box, each can being spaced from adjacent cans, as clearly shown in Fig. 2. Extending transversely of the brine box, below the level of the brine and between the rows of ice cans, is a shaft 40 which is mounted for rotation in suitable stuffing boxes formed in the walls of the box and which carries between alternate ice cans agitating devices 41 in the form of multiple bladed paddle wheels. One end of the shaft 40 is provided with a pulley 42 and a belt 43 is trained about this pulley and about a pulley 44 carried by one end of the armature shaft 45 of the electric motor 14. It will of course be understood that the electric motor may be replaced with any other suitable form of prime mover, and further that the pulleys 42 and 44 and belt 43 may be replaced by sprockets and a chain or by a train of gears, if deemed advisable. The other end of the armature shaft 45 carries a pinion 46 which constantly meshes with a spur gear 47 which in turn is idly mounted upon the extended end of the crank shaft 48 of the compressor 13. This crank shaft is journaled in suitable bearings formed in the crank shaft casing 49 of the compressor and also in a bearing 50 located adjacent the motor and carried by a bracket 51. The outer face of the gear 47 is provided with a plurality of clutch pins 52 adapted to seat in sockets 53 formed in the opposed face of a clutch disk 54. The hub of this clutch disk is provided with a circumferential groove 55 to receive rollers carried by the terminals of the fork arms 56 of a pivotally mounted shipper lever 57 by means of which the clutch disk may be moved into or out of active engagement with the gear to lock the latter with respect to the shaft 48, the clutch disk being keyed or otherwise secured against turning movement independent of the shaft 48. A fly wheel 58 is carried by the crank shaft 48, preferably at a point between the bearing 50 and the crank case of the compressor.

As the compressor, aside from its inlet and outlet valves and their controlling mechanism, is of conventional form, no disclosure of the connection between the crank shaft 48 and the piston 59, which operates in the cylinder 60, is deemed necessary. A spur gear 61 is keyed or otherwise secured upon the crank shaft of the compressor, preferably within the crank case thereof, and this gear meshes with a second gear 62 carried by a cam shaft 63 which is journaled in suitable bearings carried by the crank case and one end of which projects beyond the case, as shown in Figs. 1 to 3 of the drawings.

The cylinder head 64 of the compressor is provided with spaced inlet and outlet ports 65 and 66, respectively, each port being surrounded by an upwardly directed, circumferential flange 67, the free edges of which are interiorly threaded to receive the stuffing boxes 68, through which extend the valve stems 69 and 70 of the inlet and outlet valves 71 and 72, respectively. As best shown in Fig. 4 of the drawings, the inlet valve is adapted to open by inward movement, while the outlet valve is adapted to open by outward movement. The valve stems are formed intermediate their length with stop shoulders 73 to receive spiders 74 which are held in place by clamp nuts 75 and helical springs 76 are interposed to normally hold the valves in closed position, the helical spring of the inlet valve being disposed between the spider and valve seat, while the spring of the outlet valve is disposed between the spider and stuffing box. The outer end of the valve stem 70 is provided with a head 77.

The outwardly extended end of the cam shaft 63 carries outer and inner cam members 78 and 79, each in the form of a disk concentrically mounted upon the cam shaft and provided with cam portions 80 and 81, each set into the peripheral edges of their respective disks. As shown, the cam portion 81, which is to control the inlet valve 71, as will be later explained, is not so greatly offset and is less abrupt than the cam portion 80 which is to control the outlet valve 72. By this means, the inlet valve is held open a sufficient length of time to insure the drawing of a complete charge of the ammonia gas into the cylinder, while the outlet valve is opened more rapidly and more widely and closed sooner in order to insure the driving out of all of the compressed gas and at the same time to insure complete closing of the outlet valve by the beginning of the inlet stroke of the compressor piston. A cam lever 82 is pivoted intermediate its length upon a bracket 83 carried by the crank casing of the compressor and is formed at one end with a downwardly curved terminal carrying a roller 84 which engages the peripheral face of the cam member or disk 79. A cam rod 85 is pivotally connected at one end to the opposite end of this lever 82 and at its opposite end to a valve operating lever 86 which is pivotally mounted intermediate its length upon a bracket 87 carried by the cylinder head, as best shown in Fig. 2 of the drawings, the free end of this lever being offset laterally to engage against the free end of the intake valve stem 69. A second cam rod 88 is reciprocally mounted through a bracket 89 carried by the crank case of the compressor and is provided at its lower end with a roller 90 which engages the peripheral face of the cam member 78. The upper end of this second cam rod is pivotally connected to one end of a bell crank lever 91 which is pivoted intermediate its length upon a bracket 92 carried by the head and the free arm of which extends backwardly in substantially parallel relation to that arm connected to the cam rod 88, being forked at its free end as shown at 93 to operatively engage the valve stem 70 and its head 77 of the outlet valve 72.

From the foregoing description it will be apparent that the cam lever which is connected to the cam rod which actuates the inlet valve, operatively engages the lower peripheral face of its cam member, while the cam rod which actuates the outlet valve, operatively engages the upper peripheral face of its cam member. For this reason, the cam portions 80 and 81 are set upon corresponding parts of the cam disks. The connections between the cam rods 85 and 88 and the valve levers 86 and 91, in each instance, includes an internally threaded coupling or sleeve 94 which is pivoted to its respective valve lever and into which the upper end of its cam rod is threaded, the cam rods being secured in proper adjusted position by set nuts 95. By this means proper adjustment of the valve operating mechanisms is provided for.

The condensing coil 15, previously referred to in a general way, may be of any desired type and is preferably supported by brackets 96 above a drip pan 97 which is in turn supported above the brine box 12 by brackets 98. This drip pan permits cooling of the condensing coils by a water spray, if deemed advisable.

From the foregoing description, taken in connection with the drawings, the general operation of our improved refrigerating plant will be readily understood. In operation, the manually operable cut-off valves 18, 29 and 30 are opened and the motor set in movement. The ammonia gas, under these circumstances, passes from the ammonia tank 10 through the pipe 17 and coil 19 of the refrigerating box 11, through the pipe 20 and coil 21 of the brine box 12, through the pipe 22 to the intake valve port 65 of the compressor, from the compressor through the pipe 25 to the condensing coil 15 and from this coil through the pipe 28 back to the ammonia tank 10, thus causing a great reduction of temperature in both the refrigerating box and brine box. The refrigerating box may therefore, be employed for the preservation of food, while the ice tanks 39 may, if desired, be filled with water in order to permit the manufacture of ice upon a small scale. The rotation of the agitator shaft 40, together with its agitator wheels, insures a satisfactory circulation of brine between the ice boxes and therefore greatly facilitates the freezing of the water contained therein. At this point it should be noted that by proper manipulation of the clutch carried by the compressor shaft 48, the compressor may, if demed advisable, be stopped without affecting the operation of the agitator. On the other hand, by merely slipping the drive belt 43 of the agitator, the agitator may be stopped while the compressor remains running.

Upon the down stroke of the piston 59 of the compressor, the cam member 79 depresses the cam lever 82, moving the cam rod 85 upwardly to rock the valve lever 86 and open the inlet valve of the compressor. By the time the piston has nearly reached the bottom of its stroke, the cam member 79 will have turned to such an extent as to permit the spring 76 to close the inlet valve. Immediately prior to the time at which the piston reaches the limit of its upward stroke, the cam member 79 operates to raise the cam rod 88 and rock the valve lever 91 of the outlet valve to open the outlet valve 72 and permit the compressed ammonia gas to be forced into the pipe 25. It will of course be clear that the check valves 24 and 26 serve to absolutely prevent any backward flow of ammonia gas under any conditions.

Although we have illustrated and described our invention, in all its details, it will of course be understood that we reserve the right to make any changes, within the scope of the appended claims, without in the slightest degree departing from the spirit of our invention.

Having thus described the invention, what is claimed as new is:

1. A compressor including a compression chamber having inlet and outlet ports, a piston reciprocable in the chamber, a crank shaft for operating the piston, an inwardly moving inlet valve controlling the inlet port, an outwardly moving outlet valve controlling the outlet port, springs normally holding the valves closed, valve stems for the valves, the valve stem of the outlet valve having a head, cams carried by the crank shaft, pivotally mounted levers engaging the end of the stem of the inlet valve and the head of the stem of the outlet valve, and operating rods pivoted to the levers and operatively engaging the cams to successively force the inlet valve inwardly and outlet valve outwardly.

2. A compressor including a compression chamber and piston in the chamber, a crank shaft operatively connected to the piston, disks carried by the crank shaft, cam members seated in the peripheral edges of the disks, one of said cam members being less abrupt and less offset than the other, an outlet valve controlling passage from the compression chamber, operative connection between the outlet valve and the more abrupt cam disk, an inlet valve controlling admission to the compression cylinder, and operative connection between such valve and the other cam disk.

3. A compressor including a compression chamber and piston in the chamber, a crank shaft operatively connected to the piston, disks carried by the crank shaft, cam members seated in the peripheral edges of the disks, one of said cam members being less abrupt and less offset than the other, an outlet valve controlling passage from the compression chamber, operative connection between the outlet valve and the more abrupt cam disk, an inlet valve controlling admission to the compression cylinder, and operative connection between such valve and the other cam disk, the cam disks being correspondingly set upon the crank shaft and one valve operating mechanism engaging the upper peripheral edge of the cam disk while the other engages the lower peripheral edge of its cam disk.

In testimony whereof we affix our signatures in presence of two witnesses.

PAUL R. FOWLER. [L. S.]
JOHN A. GINGRICH. [L. S.]

Witnesses:
C. GINTZ,
D. H. WOOD.

Copies of this patent may be obtained for five cents each, by addressing the "Commissioner of Patents, Washington, D. C."